United States Patent
Boullosa Vazquez et al.

(10) Patent No.: US 7,377,543 B2
(45) Date of Patent: May 27, 2008

(54) VEHICLE STEERING WHEEL WITH FLOATING HORN

(75) Inventors: Javier Boullosa Vazquez, Pontevedra (ES); Jorge Ollero Ollero, Pontevedra (ES)

(73) Assignee: Dalphi Metal España, S.A., Madrid (ES)

( * ) Notice: Subject to any disclaimer, the term of this patent is extended or adjusted under 35 U.S.C. 154(b) by 0 days.

(21) Appl. No.: 11/708,714

(22) Filed: Feb. 20, 2007

(65) Prior Publication Data

US 2007/0210564 A1  Sep. 13, 2007

(30) Foreign Application Priority Data

Mar. 13, 2006  (ES) ............................. 200600636

(51) Int. Cl.
*B60R 21/16* (2006.01)
(52) U.S. Cl. ............... 280/731; 200/61.54; 200/61.55; 280/728.2
(58) Field of Classification Search ............ 280/731, 280/728.2; 200/61.54, 61.55
See application file for complete search history.

(56) References Cited

U.S. PATENT DOCUMENTS

| 6,086,090 | A  | * | 7/2000  | Fischer ............. 280/728.2 |
| 6,244,620 | B1 | * | 6/2001  | Bathon et al. ....... 280/731   |
| 6,312,012 | B1 | * | 11/2001 | Bohn et al. ........ 280/731    |

* cited by examiner

*Primary Examiner*—Eric Culbreth
(74) *Attorney, Agent, or Firm*—Ladas & Parry

(57) ABSTRACT

The invention relates to a steering wheel (11) of an automotive vehicle with an airbag module (21) fixed thereto through at least one intermediate device (33) comprising a spring (37), a positioning plate (35) incorporating at its upper part a hollow cylindrical body (53) surrounding a central hole and elements (55) cooperating with the snap-fitting connection (57) of the airbag module (21) and at its lower part a slot for housing said spring (37) and two stops (59); a screw (41) for fixing the intermediate device (33) to the framework (17) and a bushing (39) with a hole for the passage of said screw (41); said hollow cylindrical body (53) and said bushing (39) being configured such that the latter is located inside the former and the positioning plate (35) can be fixed to the framework (17) and at the same time can move vertically compressing/decompressing the spring (37).

2 Claims, 1 Drawing Sheet

VEHICLE STEERING WHEEL WITH FLOATING HORN

FIELD OF THE INVENTION

The present invention relates to a steering wheel of an automotive vehicle coupled to the steering column of the vehicle with an airbag module fixed therein, and more particularly to a steering wheel of an automotive vehicle in which the horn is actuated by pressing the airbag module cover.

BACKGROUND OF THE INVENTION

Patent document U.S. Pat. No. 6,086,090 describes a vehicle steering wheel with an airbag module integrated therein through seats provided with springs such that upon pressing the cover of the airbag module the electric circuit of the horn is closed since elements thereof located in the steering wheel and in the airbag module come into contact, and with means for fixing the airbag module in the steering wheel, including positioning elements to facilitate assembling the airbag module on the steering wheel.

Patent document U.S. Pat. No. 6,244,620 describes a vehicle steering wheel with an airbag module integrated therein through seats provided with springs such that upon pressing the cover of the airbag module the electric circuit of the horn is closed since elements thereof located in the steering wheel and in the airbag module come into contact, including positioning elements located in the lower part of the airbag module cooperating with holes located in the steering wheel to facilitate assembling the airbag module on the steering wheel.

Patent document U.S. Pat. No. 6,312,012 describes a vehicle steering wheel with an airbag module integrated therein through seats provided with springs such that upon pressing the cover of the airbag module the electric circuit of the horn is closed since elements thereof located in the steering wheel and in the airbag module come into contact, said seats including means for fixing and positioning the airbag module in the steering wheel.

Patent document WO 2004/005084 describes a vehicle steering wheel with an airbag module integrated therein through seats provided with springs such that upon pressing the cover of the airbag module the electric circuit of the horn is closed since elements thereof located in the steering wheel and in the airbag module come into contact, said seats including means for predetermining a certain gap between the airbag module and one of the components of said seats.

A drawback of the prior art is that it does not satisfactorily solve the requirements relating on one hand to the airbag positioning means to facilitate the assembling thereof in the steering wheel and on the other hand to the horn actuating means to ensure a good performance thereof.

The present invention is oriented to the solution of this drawback.

SUMMARY OF THE INVENTION

The steering wheel of an automotive vehicle with an airbag module fixed therein according to the present invention comprises:
  A steering wheel structured on the basis of a framework and a foam filling and including a horn device.
  An airbag module.
  An intermediate device for fixing the airbag module to the steering wheel comprising means for snap-fitting the airbag module to the intermediate device and for fixing the intermediate device to the framework of the steering wheel.
  The intermediate device comprises:
  A positioning plate and a spring. The positioning plate has a central hole incorporating at its upper part a hollow cylindrical body surrounding said hole and at its lower part a slot for placing said spring. The positioning plate also incorporates one or more elements cooperating with the snap-fitting means of the airbag module at its upper part and two stops at its lower part.
  A screw for fixing the device to the framework of the steering wheel.
  A bushing with a hole for the passage of said screw.
  Said hollow cylindrical body and said bushing are configured such that the bushing is located inside the cylindrical body and the positioning plate can be fixed to the framework by means of said screw and at the same time can move vertically compressing/decompressing the spring.

An important feature of the present invention is that the operabilty of the horn is controlled satisfactorily throughout the entire life of the vehicle.

Another important feature of the present invention is that the fixing of the airbag module to the steering wheel ensures that the horn is not activated in an uncontrolled or inconvenient manner as a result of the vibrations withstood by the steering wheel.

Another important feature of the present invention is that it allows minimizing the gap between the airbag module and the steering wheel.

Other features and advantages of the present invention will be disclosed in the following description of an illustrative and by no means limiting embodiment of the object thereof in relation to the attached drawings.

DETAILED DESCRIPTION OF THE INVENTION

Figure 1:
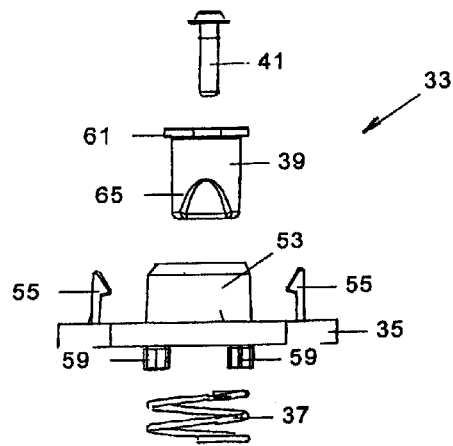
FIG. 1 shows an exploded view of the intermediate device for fixing the airbag module to the steering wheel object of the present invention.
Figure 2A:
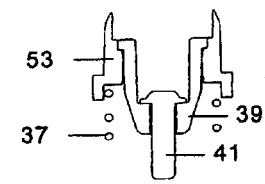
FIGS. 2a and 2b are front and side sectional views, respectively, of the intermediate device for fixing the airbag module to the steering wheel object of the present invention.
Figure 2B:
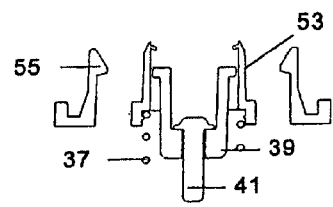

As is well known in the art, a steering wheel 11 of an automotive vehicle is structured on the basis of a framework 17 and a foam filling 19.

The airbag module 21 is fixed to the steering wheel 11 according to the present invention in at least one seat 31 (preferably in two) by means of an intermediate device 33. The latter is fixed to the framework 17 of the steering wheel 11 and the airbag module 21 is snap-fit to the intermediate device 33.

The intermediate device 33 is formed by a positioning plate 35, a spring 37, a bushing 39 and a screw 41.

The positioning plate 35 has a central hole surrounded by a hollow cylindrical body 53 at its upper part. It also includes two hooks 55 cooperating with snap-fitting means 57 arranged at the lower part of the airbag module 21 at its upper part and two stops 59 at its lower part.

The snap-fitting of the airbag module 21 in the positioning plate 35 by means of the cooperation of the snap-fitting means 57 and the hooks 55 provide a rigid fixing between the airbag module 21 and the positioning plate 35 which integrally joins them together during the vertical movements for the actuation of the horn.

The positioning plate 35 is fixed to the seat 31 provided in the framework 17 of the steering wheel with the spring 37, suitably positioned as a result of a slot provided at the lower part of the positioning plate 35, between both of them by means of the screw 41 through the bushing 39, which is introduced in the cylindrical body 53.

The bushing 39 has a head 61 and a frustoconical body 65.

In the rest position, there is no gap between the bushing 39 and the positioning plate 35 (the head 61 of the bushing 39 is supported on the base of the cylindrical body 53) but upon vertically pressing the airbag module 21 and consequently moving the positioning plate 35 downwards to actuate the horn (by means not shown that can be linked to the positioning plate 35 itself or to the airbag module 21), the positioning plate 35 is separated from the busing 39 because the body 65 thereof has a frustoconical shape.

The spring 37 is assembled between the framework 17 of the steering wheel 11 and the positioning plate 35. Once the bushing 39 is screwed, the spring 37 is compressed and this compression controls the actuation stress.

Figure 3A:
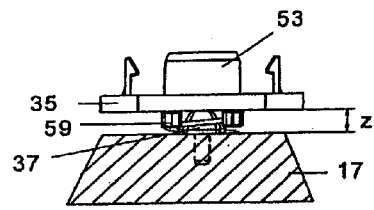
FIGS. 3a and 3b are sectional views of the intermediate device for fixing the airbag module to the steering wheel object of the present invention in the rest and activated position of the horn, respectively.
Figure 3B:
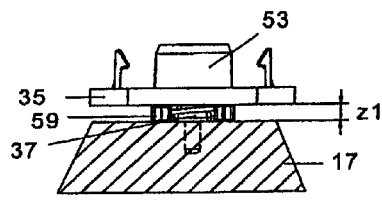
Figure 4:
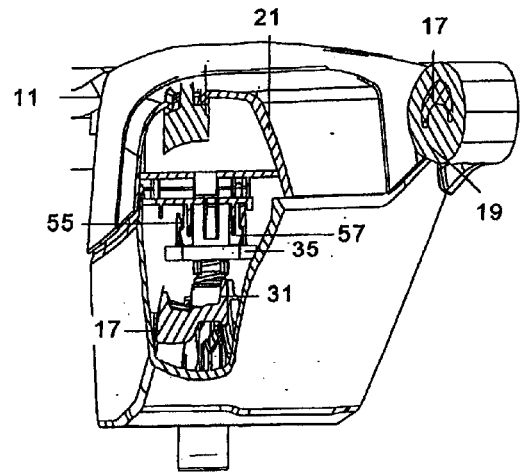
FIG. 4 is an illustrative view of the different elements of the steering wheel according to the present invention.

The movement of the positioning plate 35 is defined by two end positions. In the rest position (FIG. 3*a*), the spring 37 pushes the positioning plate 35 upwards but the bushing 39 prevents it from being disassembled, thus fixing this rest position (height z on the framework). In the horn actuation position (FIG. 3*b*), the downwards movement is limited by the stops 59 (height z1 on the framework). Thus, the movement is given by the difference between z and z1. In turn, the stress necessary to actuate the horn is given by the features of the spring 37. When the friction between the parts with relative movement (fixed bushing 39, mobile positioning plate 35) is reduced, the airbag module 21 easily recovers its rest position, keeping the movement controlled.

Although several embodiments of the invention have been described and shown, it is evident that modifications comprised within the scope thereof can be introduced therein, and the latter must not be considered limited to said embodiments but to the contents of the following claims.

The invention claimed is:

1. A steering wheel (11) of an automotive vehicle with an airbag module (21) fixed thereto through at least one intermediate device (33), the steering wheel (11) comprising a framework (17), a foam filling (19) and a horn device; the airbag module (21) comprising snap-fitting means (57) for snap-fitting to said intermediate device (33), said intermediate device (33) comprising a spring (37) to enable the actuation of the horn by means of a vertical movement of the airbag module (21), characterized in that said intermediate device (33) also comprises:

a positioning plate (35) with a central hole incorporating at an upper part a hollow cylindrical body (53) surrounding said hole and at a lower part a slot for placing said spring (37), and also incorporating one or more elements (55) cooperating with the snap-fitting means (57) of the airbag module (21) at its upper part and two stops (59) at its lower part;

a screw (41) for fixing the intermediate device (33) to the framework (17) of the steering wheel (11);

a bushing (39) with a hole for the passage of said screw (41);

said hollow cylindrical body (53) and said bushing (39) being configured such that the latter is located inside the former and the positioning plate (35) can be fixed to the framework (17) by means of said screw (41) and at the same time can move vertically, said movement at least one of compressing and decompressing the spring (37).

2. A steering wheel (11) of an automotive vehicle with an airbag module (21) fixed thereto through at least one intermediate device (33), characterized in that the bushing (39) comprises a head (61) with a larger diameter than that of the hole of the positioning plate (35) and a frustoconical hollow cylindrical body (53).

* * * * *